No. 788,889. PATENTED MAY 2, 1905.
G. CUTTER.
ANCHOR BOLT.
APPLICATION FILED JUNE 8, 1903.
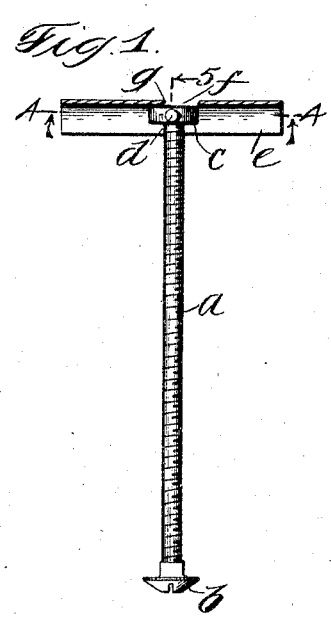
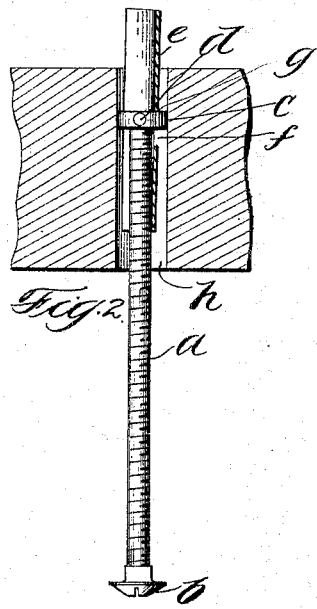
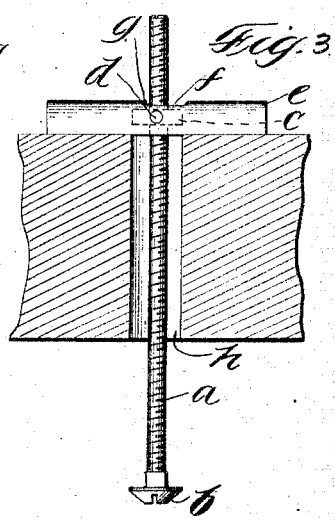
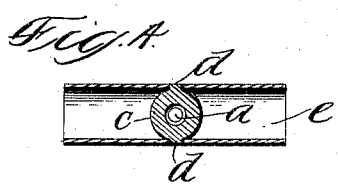
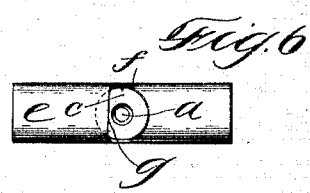
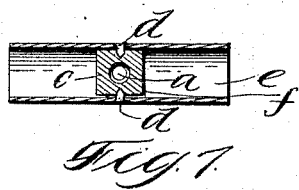
Witnesses:
Irving MacDonald
Hubert C. Barton
Inventor.
George Cutter,
By George L. Cragg.
Attorney.

No. 788,889.                                                Patented May 2, 1905.

UNITED STATES PATENT OFFICE.

GEORGE CUTTER, OF WINNETKA, ILLINOIS, ASSIGNOR TO GEORGE CUTTER COMPANY, OF CHICAGO, ILLINOIS.

ANCHOR-BOLT.

SPECIFICATION forming part of Letters Patent No. 788,889, dated May 2, 1905.

Application filed June 8, 1903. Serial No. 160,614.

*To all whom it may concern:*

Be it known that I, GEORGE CUTTER, a citizen of the United States, residing at Winnetka, in the county of Cook and State of Illinois, have invented a certain new and useful Improvement in Anchor-Bolts, of which the following is a full, clear, concise, and exact description, reference being had to the accompanying drawings, forming a part of this specification.

My invention relates to anchor-bolts, and has for its object the provision of an improved combination of anchor bolt and block whereby the construction is simplified and an efficient device is produced.

I am enabled by means of my invention to employ sheet metal that is preferably looped to form a trough-like housing for a bolt portion, such as the nut, the trunnion-shafts projecting inwardly from the side walls toward the nut that is thus confined, but is permitted to rotate between the said walls. I provide an opening over the nut through which the shank or shaft of the bolt passes. This opening is desirably so proportioned that when the anchoring-block is placed longitudinally a transverse edge along the opening will engage the nut to limit the motion of the block to aid in holding said block in position preparatory to threading or pushing the same through the opening in the timber or other element designed to receive it. This structural feature and advantage I am enabled to secure by making the block in a trough shape of sheet metal and affording trunnion connections therein with the nut, so that the trunnions may be provided upon either member and readily slipped into sockets or recesses in the other member, enabling the parts to be cheaply made in separate lots and quickly assembled. Special retaining devices hitherto employed for the purpose of holding these parts together are eliminated by means of my invention. The block of trough shape being of sheet metal is adapted to have its side walls separated to permit of the placement of the trough and nut and the engagement of the trunnions with their sockets without re-forming or permanently bending any of the parts.

I will explain my invention more fully by reference to the accompanying drawings, illustrating the preferred embodiment thereof, in which—

Figure 1 is an elevation of a bolt with the block in section. Fig. 2 is a view similar to Fig. 1, the block passing through an opening in a timber. Fig. 3 is a view in elevation, the block having passed through its aperture in the timber, then acting as an anchor for the bolt. Fig. 4 is a longitudinal sectional view on line 4 4, Fig. 1. Fig. 5 is a cross-sectional view on line 5 of Fig. 1. Fig. 6 is a plan of the structure as it appears in Fig. 3. Fig. 7 is a view similar to Fig. 4 with a modified form of nut and with the trunnions provided upon the housing instead of upon the nut.

Like parts are indicated by similar characters of reference throughout the different figures.

The bolt may comprise an ordinary threaded shank $a$, having a head $b$ and a nut $c$, provided with trunnions $d\ d$, the head being preferably slotted for the application of a screw-driver. The nut $c$ is united, by means of the trunnions $d\ d$, with the anchoring-block $e$, which for the purpose is formed of sheet metal, desirably of U shape in cross-section, the trunnions projecting inwardly from the side walls of the block. These trunnions may either be carried directly upon the nut or other bolt portion and journaled within pockets in the sides of the block, as indicated in Figs. 1 to 6, inclusive, or they may be fixed upon the block and have the nut rotatably mounted thereon, as indicated in Fig. 7. The trunnions are located in position by bending the side walls of the trough-like or U-shape block, the flexibility of the material composing the block enabling said side walls to resume their previous relative positions to engage the trunnions with their sockets. In order that the shank may issue through the block when said block is horizontal, as indicated in Fig. 3, I provide an opening $f$ in the top wall thereof, which opening preferably permits of the rotation of the block in one direction only, a margin or edge portion $g$ of the opening extending sufficiently close to the shaft so that it engages the nut c to maintain the anchoring-bolt in a suitable position as it passes through the opening h provided for it.

I do not wish to be limited to the precise shape of the opening f disclosed nor to the precise details of construction illustrated; but,

Having thus described my invention, I claim as new, and wish to secure by Letters Patent, the following:

In an anchor-bolt, the combination with an anchor-block formed of sheet metal and made U shape in cross-section, of a bolt's shank, a nut therefor and trunnions within the block engaging the side walls of the block and said nut, the top wall of the block being provided with an opening through which the bolt's shank may issue as it is screwed through the nut, a transverse edge of the opening being close to the shank to engage the nut when the block is placed vertically, substantially as described.

In witness whereof I hereunto subscribe my name this 4th day of June, A. D. 1903.

GEORGE CUTTER.

Witnesses:
ALBERT SCHEIBLE,
ANNA A. GOODWIN.